United States Patent [19]
Watson

[11] Patent Number: 6,065,487
[45] Date of Patent: May 23, 2000

[54] VALVE WITH DIFFERENT CONFIGURATIONS FOR DIFFERENT USES

[75] Inventor: Nigel S. Watson, Martinez, Calif.

[73] Assignee: Amot Controls Corp., Richmond, Calif.

[21] Appl. No.: 09/197,789

[22] Filed: Nov. 23, 1998

[51] Int. Cl.$^7$ ..................................................... F16K 11/02
[52] U.S. Cl. ................ 137/271; 137/625.64; 137/625.69
[58] Field of Search ..................... 137/270, 271, 137/269, 625.69, 625.64, 884, 625.6

[56] References Cited

U.S. PATENT DOCUMENTS

| | | | |
|---|---|---|---|
| 3,993,091 | 11/1976 | Loveless | 137/271 X |
| 4,063,568 | 12/1977 | Sosulnikov et al. | 137/271 X |
| 4,520,841 | 6/1985 | Brand et al. . | |
| 4,898,203 | 2/1990 | Kobelt | 137/884 X |
| 4,986,299 | 1/1991 | Schultz | 137/269 |
| 5,111,840 | 5/1992 | Miller et al. | 137/270 |
| 5,586,570 | 12/1996 | Fukano et al. | 137/625.69 X |
| 5,819,783 | 10/1998 | Blatt et al. | 137/625.64 X |

*Primary Examiner*—Kevin Lee
*Attorney, Agent, or Firm*—Henderson & Sturm LLP

[57] ABSTRACT

A valve having a valve body with an elongated opening therein and having a first end and a second end. A valve member is slidably disposed in the elongated opening. First, second and third ports are in fluid communication with the opening in the valve body at times. One of the first, second and third ports have a supply of fluid under pressure connected thereto. A first passage is disposed in the valve body and leads from the first port to the second end thereof. A second passage is disposed in the valve body and leads from the second port to the second end thereof. A third passage is disposed in the valve body and leads from the third port to the second end thereof. An actuator body is adapted to be connected to the valve body and has a cavity therein. The actuator body has a first end adjacent to the second end of the valve body. An actuator is disposed in the cavity. The actuator has a first side and a second side and is moveable between a first and a second position thereof for moving the valve member. A fluid passageway is disposed in the actuator body and leads from the first end of the actuator body to a position on the second side of said actuator and is adapted to be selectively connected in one of a first, second and third configuration at any one time to one of the first, second and third passages and is adapted to be connected to any one of the first, second and third passages of a user's choosing.

10 Claims, 7 Drawing Sheets

VALVE WITH DIFFERENT CONFIGURATIONS FOR DIFFERENT USES

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to valves and more particularly to a valve with different configurations for different uses.

2. Description of the Related Art

Pilot operated solenoid valves come in various configurations depending upon the desired use. For example, such a valve might be normally open and when it is moved to a second position, it would be closed. Another configuration would be for the valve to be normally closed. For example, biased to a closed position, and movable to another position wherein it is open. Still another configuration of a valve could be a diverting valve where it is biased to a first position so that a supply of fluid goes to a first outlet port and the valve being movable to a second position wherein the supply is connected to a different outlet port and wherein the first outlet port is no longer connected thereto.

In order to accommodate all of the customer's needs, it requires that there be an inventory of each one of these aforementioned types of valves in stock, in order to supply the customer when such specialized valve is requested. This is true both by a manufacturer, a wholesaler or a retailer.

There is therefore a need for a valve of the aforementioned type which can be easily re-configured to be any one of the three types by merely changing around the parts, for example it could be any one of the normally open, normally closed or diverting, depending upon what the customer wanted.

U.S. Pat. No. 4,520,841 to Brand et al shows a 4-way spool valve which can be converted and re-configured to provide some flexibility in not needing to have anymore parts on hand than are necessary in order to supply 4-way valves convertible between three different modes. There is, however, still a need for such a structure which can be re-configured to provide a normally open, normally closed or diverting mode.

BRIEF SUMMARY OF THE INVENTION

The present invention relates to a valve having a valve body with an elongated opening and having a first end and a second end. A valve member is slidably disposed in the elongated opening and the elongated opening communicates with a first, second and third port in the valve body at times. One of the first, second and third ports can be selected to have a supply of fluid under pressure connected thereto. A first passage is disposed in the valve body and leads from the first port to the second end thereof. A second passage is disposed in the valve body and leads from the second port to the second end thereof. A third passage is disposed in the valve body and leads from the third port to the second end thereof.

An actuator body is adapted to be connected to the valve body and has a cavity therein. The actuator body has a first end adjacent to the second end of the valve body. An actuator is disposed in the cavity. The actuator has a first side and a second side and is movable between the first and a second position thereof for moving the valve member. A fluid passageway is disposed in the actuator body and leads from the first end of the actuator body to a position on the second side of the actuator and is adapted to be selectively connected to one of the first, second and third passages at a user's choosing. In a preferred embodiment, a solenoid valve is operably attached to the actuator body for selectively opening or closing a fluid passageway whereby the actuator adjacent to the valve member will selectively be moved accordingly.

The valve has a first configuration wherein a biasing spring causes the spool to close the supply port and the actuator causes the spool valve to move to a position to allow communication between the supply port and one of the other ports when the actuator moves in the other direction, whereby the valve acts as a normally closed valve.

The valve also has a second configuration, with a biasing spring which causes the supply port to be in communication with another one of the ports and actuation of the actuator causes the spool valve to move to a position to block flow from the supply port whereby the valve acts as a normally open valve.

The valve also has a third configuration wherein the biasing spring causes the supply port to be in fluid communication with one of the other non-supply ports and actuation of the actuator causes the spool valve to move to a position to switch fluid communication from one non-supply port to the other non-supply port, whereby said valve operates as a diverting valve.

An object of the present invention is to provide an improved valve with different configurations for different uses.

A further object of the invention is to provide a valve which by using the same parts, but in a different configuration, can be used to provide any one of a normally open mode, a normally closed mode or a diverting mode.

Other objects, advantages, and novel features of the present invention will become apparent from the following detailed description of the invention when considered in conjunction with the accompanying drawings.

DETAILED DESCRIPTION OF THE INVENTION

Figure 1:
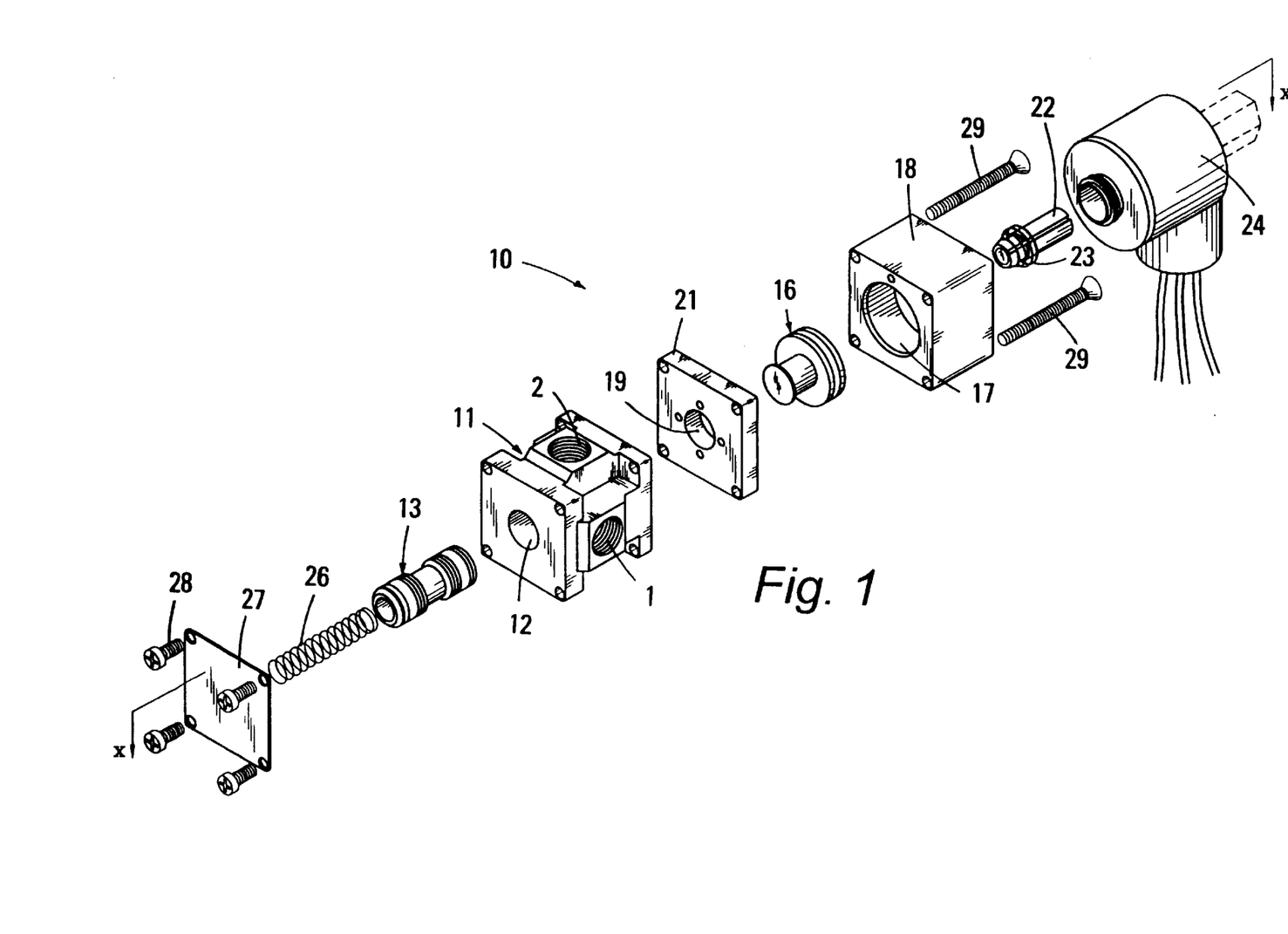
FIG. 1 is a perspective exploded view of the present invention in a preferred embodiment.

Referring now to the drawings, wherein like reference numerals designate identical or corresponding parts throughout the several views, FIG. 1 shows the invention depicted generally at (10). The O-rings in FIG. 1 have been omitted for simplicity purposes, but can be seen in the other views. A valve body (11) has an elongated opening (12) therein for receiving a valve member (13). An actuator (16) is disposed in a cavity (17) of actuator body part (18) and is also received in cavity part (19) of actuator body part (21).

A solenoid valve member (22) has longitudinal grooves thereon and a compression helical spring (23) and fits in a solenoid valve body (24). A helical compression spring (26) abuts a plate (27) on one end and the spool valve (13) on the other end thereof to bias the spool valve (13) to the right as shown in all of the drawings. Bolts (28) attach the plate (27) to the valve body (11) and bolts (29) attach the actuator body parts (18) and (21) to the valve body (11).

Normally Closed Mode

Figure 2A:
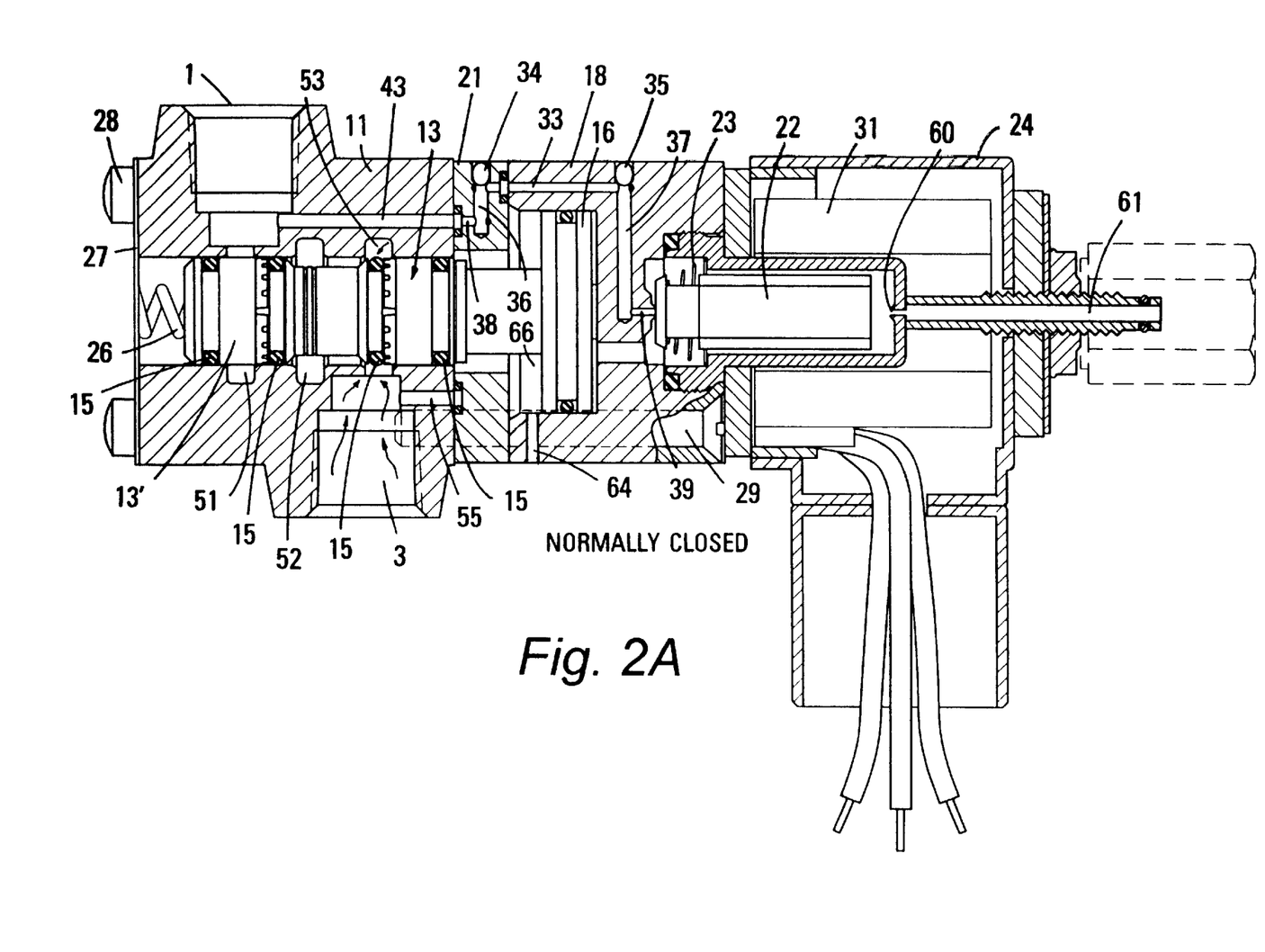
FIG. 2A shows a configuration of the valve of FIG. 1 in a normally closed position.

Referring now to FIG. 2A, the valve (10) is shown fully assembled and with the supply port 1 being shown at the top thereof For simplicity of explanation, the supply port, whether port 1, port 2 or port 3 in valve body (11) will always be shown at the top of the page. In FIG. 2A, (31) is an electronic coil which, when activated, causes the solenoid valve member (22) to move from the position shown in FIG. 2A to the position shown in FIG. 2B. The FIG. 2A configuration shows the actuator body parts (18) and (21) affixed to the valve body (11) in such a way that a passageway (33) is in fluid communication with first passage (43). Viton® rubber balls (34) and (35) are placed in passageways (36) and (37) to prevent flow of fluid from leaking outside of the passageway formed by bores (38), (36), (33) and (37). When it is desired to have this configuration, visually the port 1 can be lined up with the two rubber balls (34) and (35) in order to know where the passageway (33) is located in the actuator body parts (18) and (21). This arrangement of FIG. 2A shows the valve (13) normally closed in that there can be no flow from chamber (51) because the spool portion (13') blocks the chamber (51) and has O-rings (15) on each side thereof.

Figure 2B:
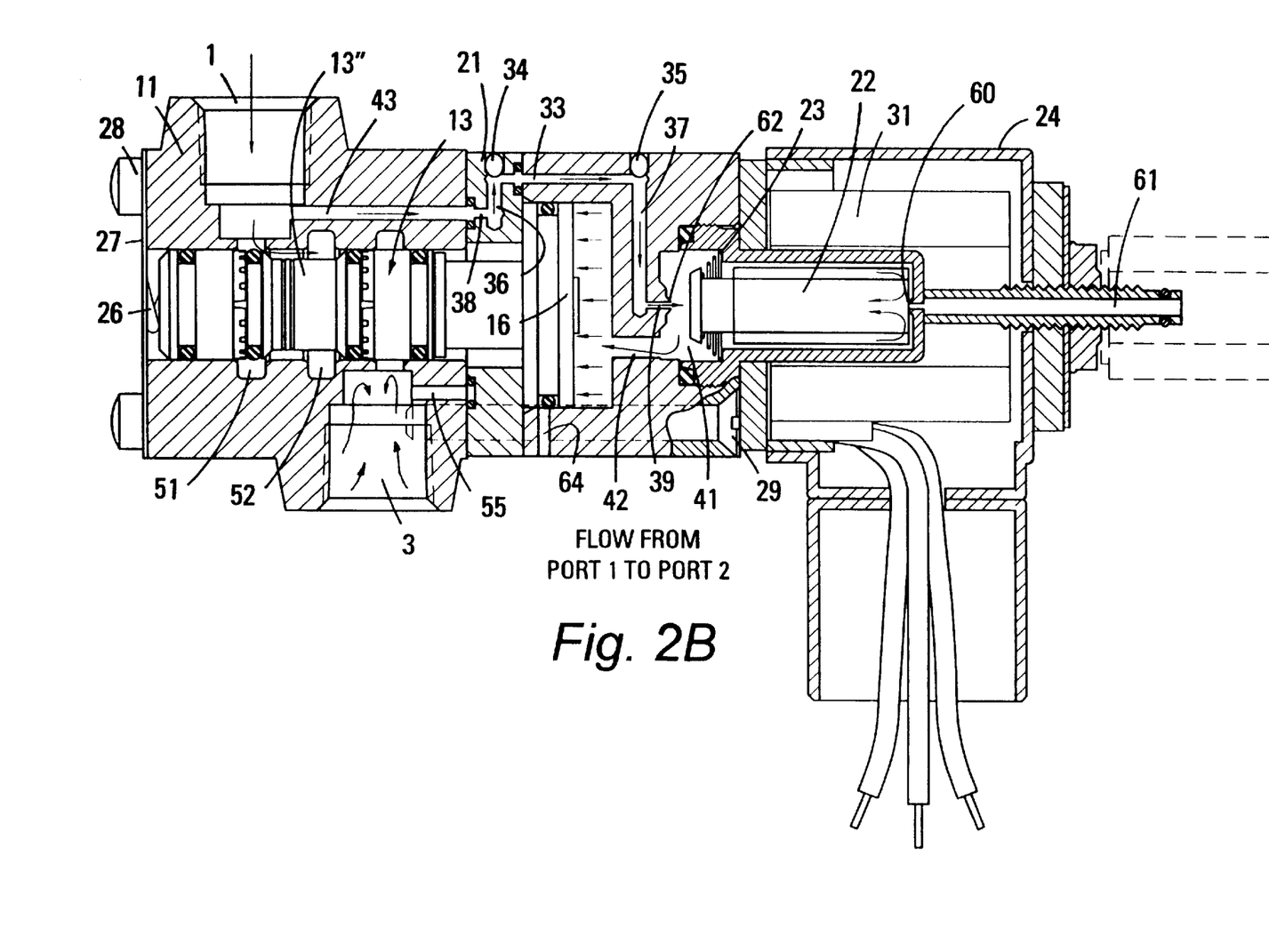
FIG. 2B shows the same normally open configuration as in FIG. 2A, but showing the solenoid opening the valve to cause flow from the supply port to an outlet port.

When it is desired to open the valve from the FIG. 2A normally closed position, the coil (31) is activated, which pulls the solenoid valve (22) from the position shown in FIG. 2A to the position shown in FIG. 2B. This causes the solenoid valve to seal on the back at seat (60), preventing flow out of passage (61), but allowing flow from the supply port 1 to pass through passage (43) and the passageway formed by bores (38), (36), (33), (37) and (39), past seat (62), and into chamber (41) and (42) to cause the piston actuator (16) to be forced by pressure to the left as shown in FIG. 2B. This also moves the spool valve (13) to the left against the pressure of the spring (26). When the valve (13) is so moved, flow from the supply port 1 can pass out through chamber (51), past the narrow part (13") of the spool valve (13), and into the chamber (52) leading to outlet port 2. A vent (64) to chamber (66) allows the piston actuator (16) to move to the left without compressing air in the chamber (66).

When it is desired to stop the flow in the FIG. 2B configuration, energy is removed from the coil (31) and the spring (23) again biases the valve member (22) against the seat (62) to block off flow to the right side of the piston as shown in FIG. 2B. When this occurs, the spring (26) will bias the spool valve (13) and the actuator piston (16) to the right, back to the position shown in FIG. 2A and the fluid on the right side of the actuator piston (16) will be allowed to flow through opening (42), chamber (41), past the grooves in solenoid valve (22) and past seat (60) and out passageway (61). If not so vented, the piston (16) could not move to the right from the position shown in FIG. 2B to the position shown in FIG. 2A. Once the solenoid valve member (22) is back to the position shown in FIG. 2A, the valve (13) will again be normally closed with no flow passing therethrough.

Diverting Mode

Figure 3A:
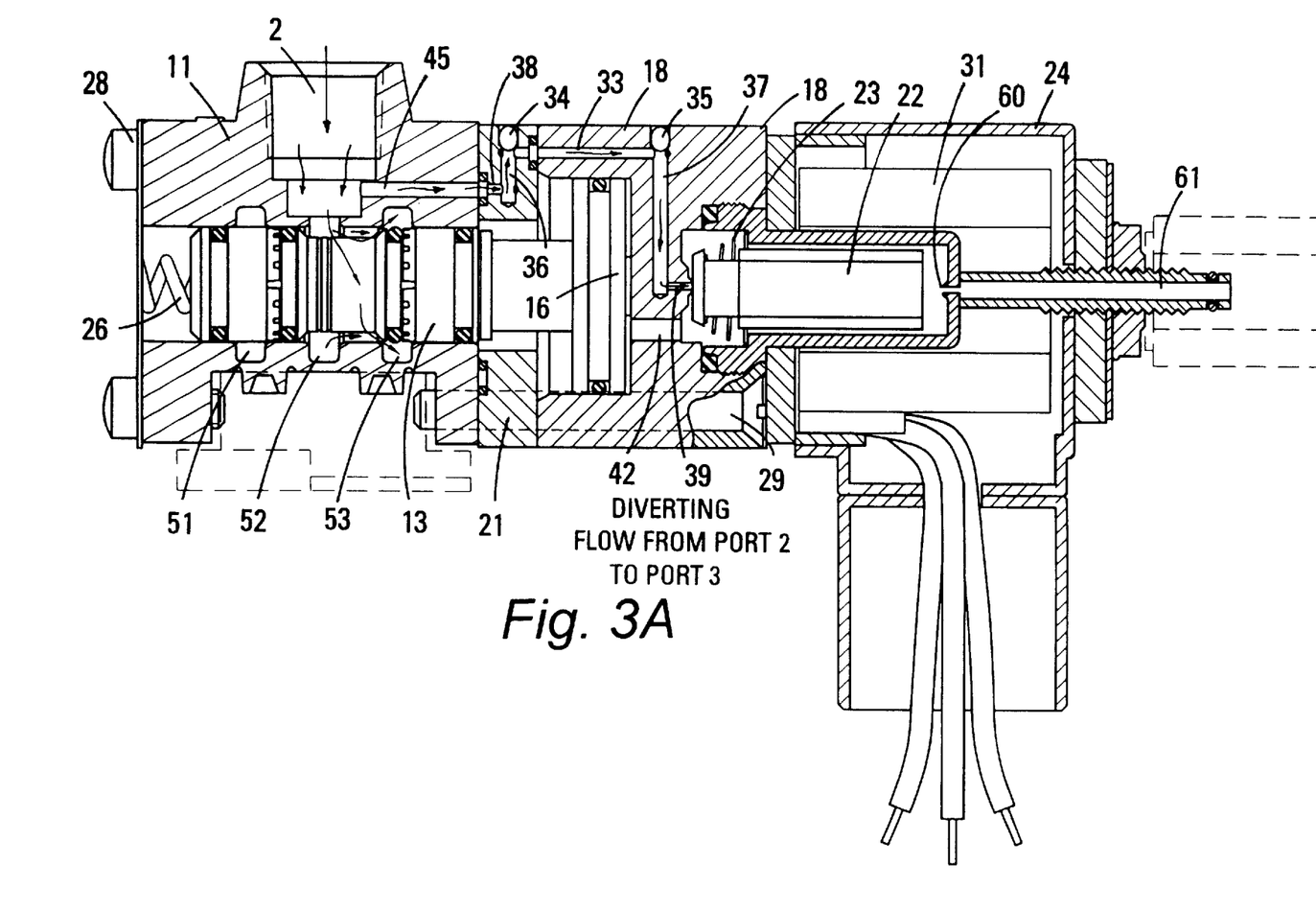
FIG. 3A shows a second configuration of the valve of FIG. 1, which is in a diverting mode, wherein it is biased to a position wherein flow goes to a supply port to an outlet port.
Figure 3B:
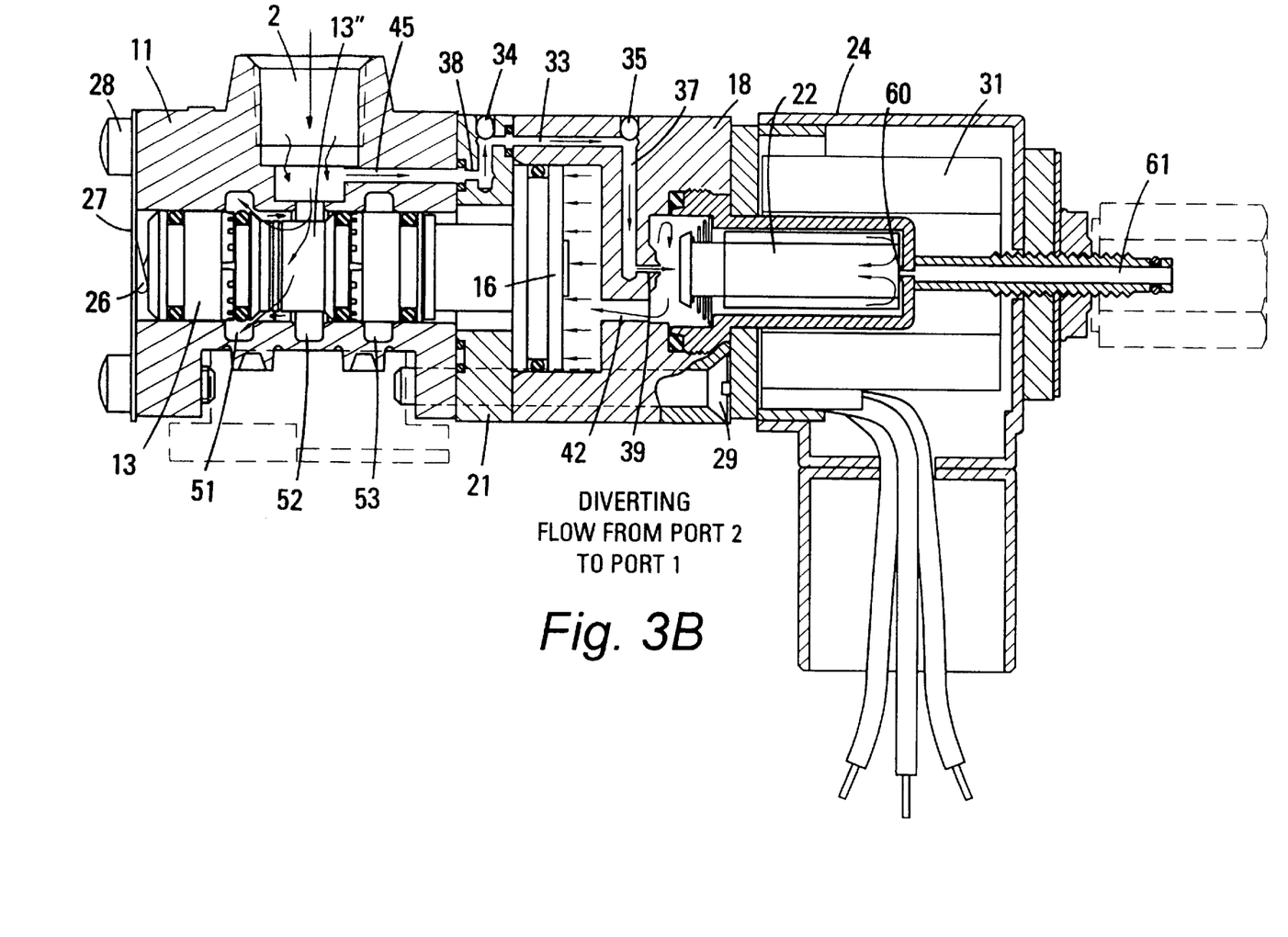
FIG. 3B shows the diverting mode of FIG. 3A but shows the valve moved by a solenoid valve to a diverting flow position from the supply port to a different outlet port than where the flow is going in FIG. 3A.

When it is desired to convert the valve (10) to a diverting mode, the passageway (38) is aligned with the passage (45) leading from port 2, which now becomes the supply port. This conversion from the FIG. 2A and FIG. 2B, normally closed configuration, to the FIG. 3A/FIG. 3B, diverting mode, is done by aligning the rubber balls (34) and (35) on actuator body parts (21) and (18) with the port 2. In a FIG. 3A configuration, the spring (26) normally biases the valve member (13) to the position shown in FIG. 3A wherein the supply port 2 is in communication with the chamber (53) leading to what now becomes an outlet port 3. When it is desired to divert flow from supply port 2 from the outlet port 3 to the outlet port 1, the coil (31) is activated, thereby causing the solenoid valve to move to the position shown in FIG. 3B. When this is done, the pressure from the supply port 2 will cause the piston actuator (16) to move to the left, thereby causing flow to be diverted from outlet port 3 to outlet port 1, because the small diameter portion (13") of valve member (13) causes fluid communication between chambers (51) and (52) when in the FIG. 3B position.

Normally Open Mode

When it is desired to convert valve (10) to a normally open mode, the bolts (29) are removed and the actuator body parts (18) and (21) are rotated until the rubber balls (34) and (35) are aligned with port 3. This will allow fluid communication from fluid port 3 to passage (55) and then through passageway parts (36), (33), (37) and (39) as explained above. In the normally open mode of FIG. 4A with the solenoid valve member (22) biased by the spring (23) to the closed position as shown in FIG. 4A, the flow will be allowed to go from what is now the supply port 3 to what is now the outlet port 2 through annular chambers (53) and (52) respectively.

Figure 4A:
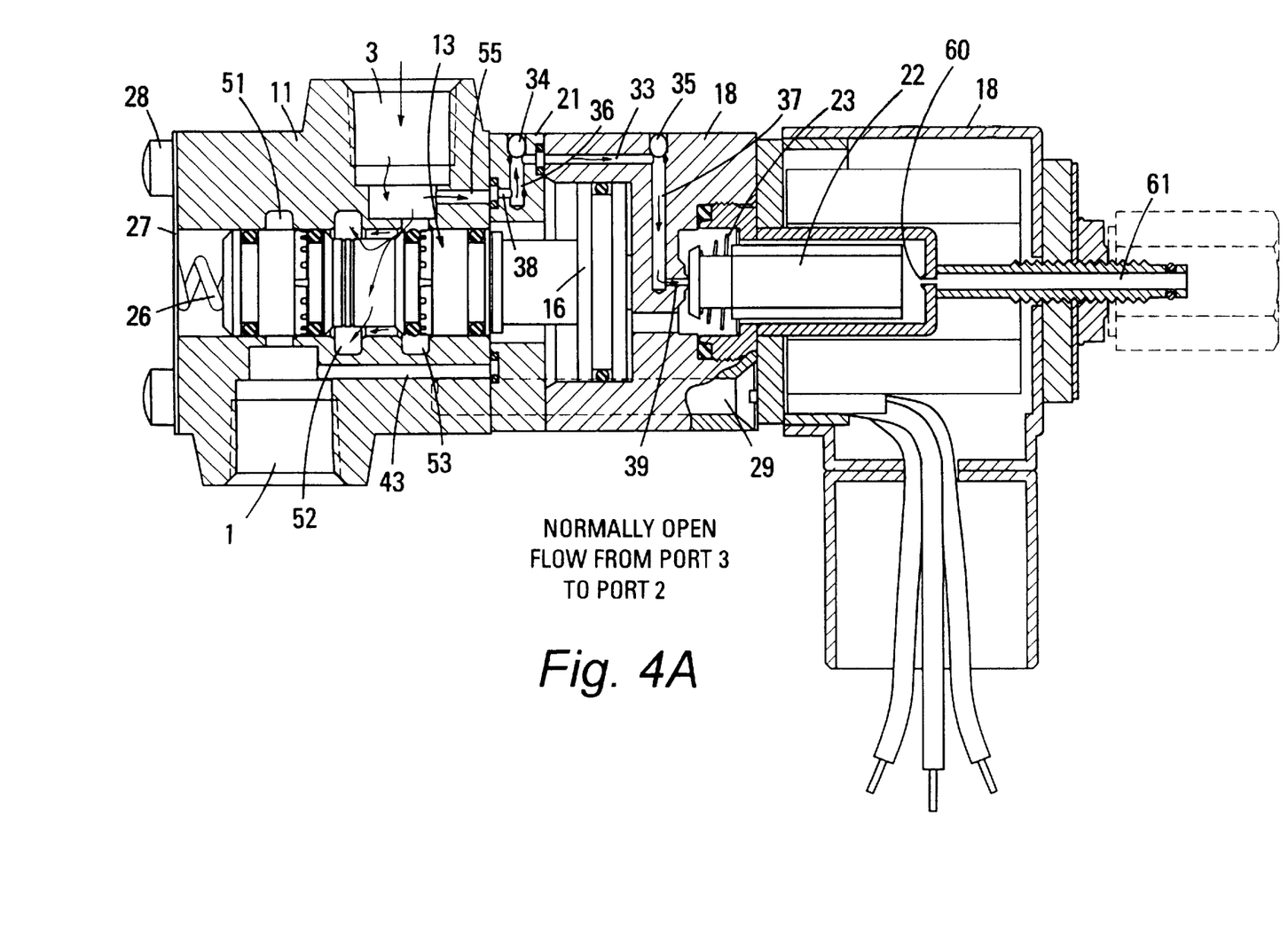
FIG. 4A shows a third configuration of the valve of FIG. 1 which is a normally open configuration wherein flow from a supply port leads to an outlet port.
Figure 4B:
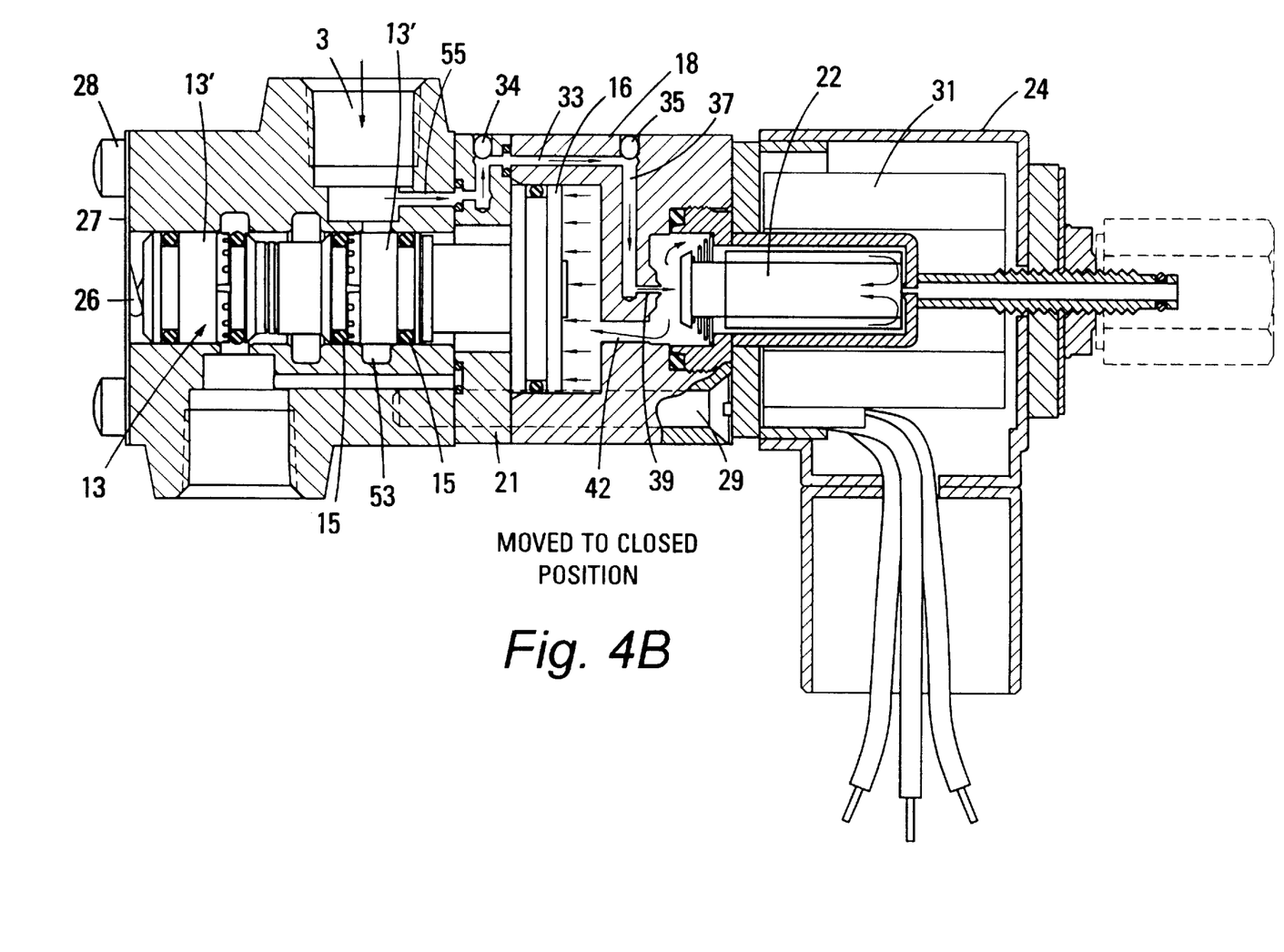
FIG. 4B is the same third configuration as shown in FIG. 4A, but showing the solenoid valve opening, thereby moving the spool valve to a closed position where there is no flow from the supply port to any of the outlet ports.

When it is desired to close the valve in the FIG. 4A configuration, the solenoid valve member (22) is moved by actuating the coil (31), causing the solenoid valve member to move to the left as shown in FIG. 4B. This will cause pressure from what is now the supply port 3 to move the piston (16) to the left, thereby also moving the valve member (13) to the left, shutting off the flow from supply port 3 and preventing it from going to either one of the ports 1 and 2. As shown in FIG. 4B, the O-rings (15) on each side of the enlarged portion (13') prevents flow through chamber (53). Of course, when it is desired to again open the valve (13) from the FIG. 4B position, the coil (31) is the energized and the spring (23) will push the solenoid valve member (22) back to the position shown in FIG. 4A, which will relieve the pressure on the right side of the piston (16) and allow whatever fluid is on the right side of (16) to exit through opening (61) past seat (60). Once the valve member (13) is moved back to the position shown in FIG. 4A, it is again normally open and allows flow from what is now the supply port 3 to what is now the outlet port 2 through annular chambers (53) and (52) and the space between valve member (13) and the space between the valve member (13) and the opening (12) in the valve body (11).

It will be understood, of course, that the valve can be moved to any one of the three aforementioned modes from any other one of the aforementioned modes and the object of being able to have an inventory of just the parts shown in FIG. 1 (plus the O-rings) also would reduce the cost of inventory in order to supply customers with whatever one of the three valve configurations they want without the high cost of having all three in inventory. It will therefore be appreciated that the preferred embodiment disclosed herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A valve comprising:

a valve body having an elongated opening therein, said valve body having a first end and a second end;

a valve member slidably disposed in said elongated opening;

a first port in fluid communication with said opening;

a second port in fluid communication with said opening;

a third port in fluid communication with said opening;

one of said first, second and third ports having a supply of fluid under pressure connected thereto;

a first passage disposed in said valve body and leading from the first port to the second end thereof;

a second passage disposed in said valve body and leading from the second port to said second end thereof;

a third passage disposed in said valve body and leading from the third port to said second end thereof;

an actuator body adapted to be connected to said valve body, said actuator body having a cavity therein, said actuator body having a first end adjacent to the second end of said valve body;

an actuator disposed in said cavity, said actuator having a first side and a second side and being moveable between a first and a second position thereof for moving said valve member; and a fluid passageway disposed in said actuator body leading from the first end of the actuator body to a position on the second side of said actuator and adapted to be selectively connected in one of a first, second and third configuration at any one time to one of the first, second and third passages and adapted to be connected to any one of the first, second and third passages of a user's choosing.

2. The apparatus of claim 1 wherein said valve includes a means for biasing said valve member in one direction.

3. The apparatus of claim 2 wherein said actuator moves said valve member in a direction opposite to said one direction.

4. The apparatus of claim 1 including a solenoid valve operatively attached to said actuator body for selectively opening or closing said fluid passageway whereby said actuator and thereby said valve member will selectively be moved accordingly.

5. The apparatus of claim 1 wherein said actuator is a piston.

6. The apparatus of claim 3 wherein said valve member is a spool.

7. The apparatus of claim 6 wherein in the first configuration the biasing means causes said spool to close said supply port and the actuator causes the spool valve to move to a position to allow communication between the supply port and one of the other said ports when the actuator moves in said opposite direction, whereby the valve acts as a normally closed valve.

8. The apparatus of claim 6 wherein in the second configuration, the biasing means causes the supply port to be in communication with another one of said ports and actuation of the actuator causes the spool valve to move to a position to block flow from the supply port, whereby said valve acts as a normally open valve.

9. The apparatus of claim 6 wherein in the third configuration, the biasing means causes the supply port to be in fluid communication with one of the other non-supply ports and actuation of the actuator causes the spool valve to move to a position to switch fluid communication from one non-supply port to the other non-supply port, whereby said valve operates as a diverting valve.

10. The apparatus of claim 4 including means for venting fluid from said second side of the actuator when said solenoid valve is closing said fluid passageway.

* * * * *